United States Patent
Gorain et al.

(10) Patent No.: US 12,137,481 B2
(45) Date of Patent: *Nov. 5, 2024

(54) PRACH PROCESSING FOR O-RU

(71) Applicant: QUALCOMM Incorporated, San Diego, CA (US)

(72) Inventors: Kanchan Kumar Gorain, Somerset, NJ (US); Raja Sekhar Bachu, Kendall Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,931

(22) Filed: Jun. 15, 2023

(65) Prior Publication Data

US 2024/0237077 A1    Jul. 11, 2024

Related U.S. Application Data

(63) Continuation of application No. 17/087,499, filed on Nov. 2, 2020, now Pat. No. 11,716,765.

(51) Int. Cl.
  *H04W 72/08* (2009.01)
  *H04L 27/26* (2006.01)
  (Continued)

(52) U.S. Cl.
  CPC ..... *H04W 74/0833* (2013.01); *H04L 27/2607* (2013.01); *H04L 27/2636* (2013.01); *H04W 72/0446* (2013.01); *H04W 72/0453* (2013.01)

(58) Field of Classification Search
  CPC ......... H04W 74/0833; H04W 72/0446; H04W 72/0453; H04L 27/2607; H04L 27/2636
  See application file for complete search history.

(56) References Cited

U.S. PATENT DOCUMENTS

2017/0331670 A1  11/2017  Parkvall et al.
2019/0132882 A1   5/2019  Li et al.
(Continued)

FOREIGN PATENT DOCUMENTS

WO    2020137072 A1    7/2020

OTHER PUBLICATIONS

Ericsson: "NR PRACH Design", 3GPP Draft, 3GPP TSG-RAN WG1 Meeting #88, R1-1702127_NR_PRACH_DESIGN, 3rd Generation Partnership Project (3GPP), Mobile Competence Centre, 650, Route Des Lucioles, F-06921 Sophia-Antipolis Cedex, France, vol. RAN WG1, No. Athens, Greece, 20170213-20170217, Feb. 7, 2017 (Feb. 7, 2017), XP051221037, pp. 1-19, figures 1, 3 Section 2.1.

(Continued)

*Primary Examiner* — Kent Krueger
(74) *Attorney, Agent, or Firm* — QUALCOMM Incorporated

(57) ABSTRACT

An O-RU may receive a PRACH preamble and a PUSCH within a plurality of symbols of a slot, the PRACH and the PUSCH having different numerology. The O-RU may filter a PUSCH CP for each symbol of the PRACH preamble through a FFT window per symbol of the PRACH preamble, the FFT window extending from the end of the PUSCH CP within a symbol to the end of the symbol, and perform FFT per the FFT window of each symbol of the PRACH preamble. The O-RU may extract I/Q data in frequency domain corresponding to the PRACH preamble, adjust phase shift of the extracted I/Q data to generate the I/Q data of the PRACH preamble accounting for shift of the each FFT window in time domain compared to FFT windows of PRACH CP filtered PRACH preamble and send the I/Q data of the PRACH preamble to an O-DU.

30 Claims, 9 Drawing Sheets

(51) Int. Cl.
*H04W 72/0446* (2023.01)
*H04W 72/0453* (2023.01)
*H04W 74/0833* (2024.01)

(56) References Cited

U.S. PATENT DOCUMENTS

| | | |
|---|---|---|
| 2019/0387546 A1 | 12/2019 | Li et al. |
| 2020/0092871 A1 | 3/2020 | Axnas et al. |
| 2020/0107235 A1 | 4/2020 | Peisa et al. |
| 2021/0175964 A1 | 6/2021 | Kusashima et al. |
| 2021/0227591 A1 | 7/2021 | Iwai et al. |
| 2022/0021423 A1 | 1/2022 | Ahmed et al. |
| 2022/0141876 A1 | 5/2022 | Gorain et al. |
| 2022/0191935 A1 | 6/2022 | Xiong et al. |

OTHER PUBLICATIONS

Huawei, et al., "PRACH Waveform for eLAA", 3GPP Draft, R1-164077, 3GPP TSG RAN WG1 Meeting #85, 3rd Generation Partnership Project (3GPP), Mobile Competence Centre, 650, Route Des Lucioles, F-06921 Sophia-Antipolis Cedex, France, vol. RAN WG1, No. Nanjing, China, 20160523-20160527, May 14, 2016 (May 14, 2016), XP051096607, 4 Pages, figure 2, Section 2.2, Scheme 2.

International Search Report and Written Opinion—PCT/US2021/053406—ISA/EPO—Jan. 12, 2022.

PRACH PROCESSING FOR O-RU

CROSS REFERENCE TO RELATED APPLICATION(S)

This application is a Continuation of U.S. Non-provisional application Ser. No. 17/087,499, entitled "PRACH PROCESSING FOR O-RU" and filed on Nov. 2, 2020, which is expressly incorporated by reference herein in its entirety.

BACKGROUND

Technical Field

The present disclosure relates generally to communication systems, and more particularly, to a physical random access channel (PRACH) processing for an open radio access network (O-RAN) radio unit (O-RU).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. An O-RU may receive a PRACH preamble and a physical uplink shared channel (PUSCH) within a plurality of symbols of a slot, the PRACH and the PUSCH having different numerology. The O-RU may filter a PUSCH cyclic prefix (CP) for each symbol of the PRACH preamble through a FFT window per symbol of the PRACH preamble, the FFT window extending from the end of the PUSCH CP within a symbol to the end of the symbol, and perform FFT per the FFT window of each symbol of the PRACH preamble. The O-RU may extract inphase and quadrature (I/Q) data in frequency domain corresponding to the PRACH preamble, adjust phase shift of the extracted I/Q data to generate the I/Q data of the PRACH preamble accounting for shift of the each FFT window in time domain compared to FFT windows of PRACH CP filtered PRACH preamble and send the I/Q data of the PRACH preamble to an O-RAN distribution unit (O-DU).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
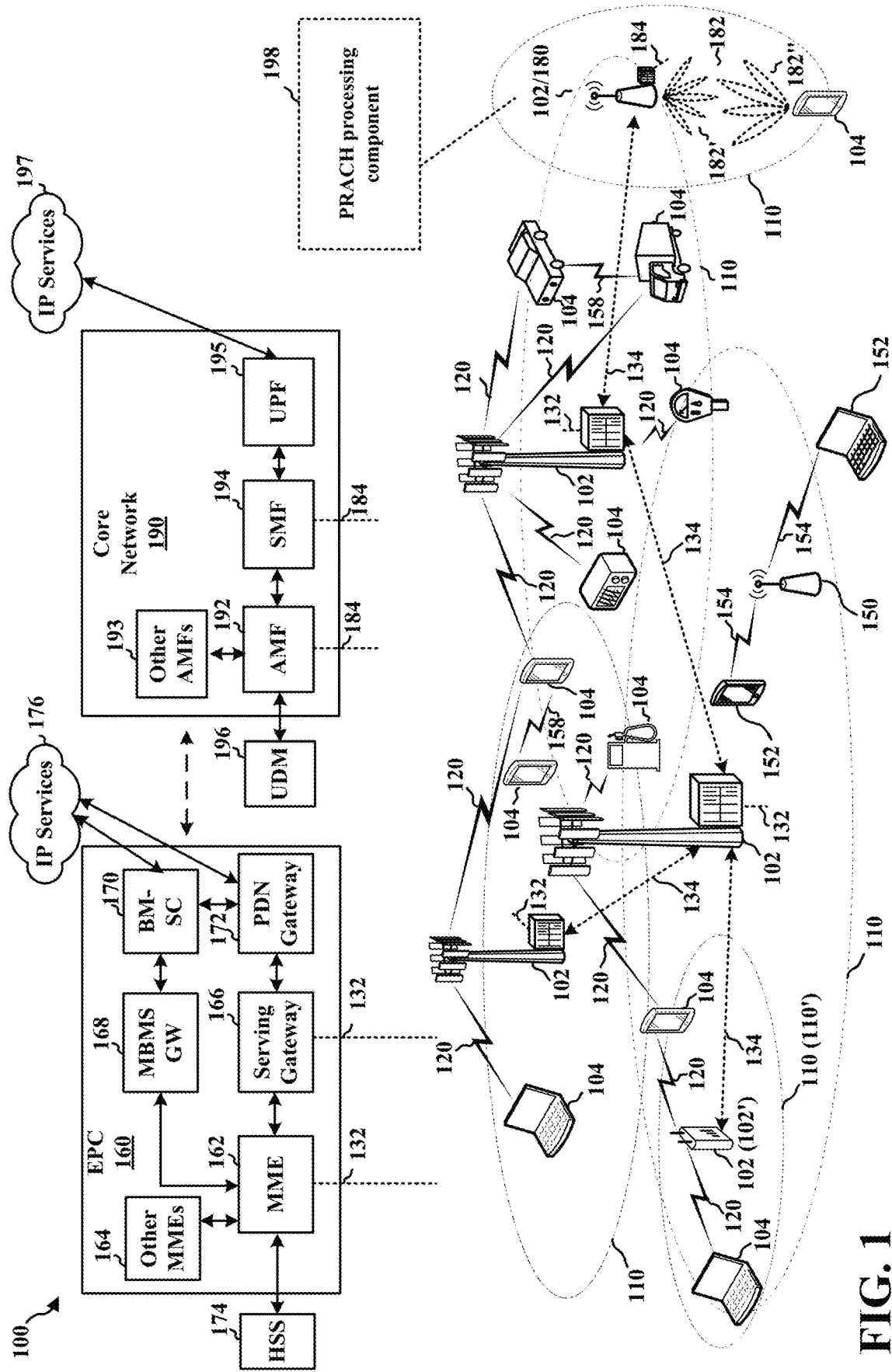
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include an O-RU including a PRACH processing component 198 configured to receive a PRACH preamble and a PUSCH within a plurality of symbols of a slot, the PRACH and the PUSCH having different numerology, filter a PUSCH CP for each symbol of the PRACH preamble through a FFT window per symbol of the PRACH preamble, the FFT window extending from the end of the PUSCH CP within a symbol to the end of the symbol, and perform FFT per the FFT window of each symbol of the PRACH preamble. The PRACH processing component 198 may further be configured to extract inphase and quadrature (I/Q) data in frequency domain corresponding to the PRACH preamble, adjust phase shift of the extracted I/Q data to generate the I/Q data of the PRACH preamble accounting for shift of the each FFT window in time domain compared to FFT windows of PRACH CP filtered PRACH preamble and send the I/Q data of the PRACH preamble to an O-DU. Although the following description may be focused on 5G NR, the concepts described herein may be applicable to other similar areas, such as LTE, LTE-A, CDMA, GSM, and other wireless technologies.

Figure 2:
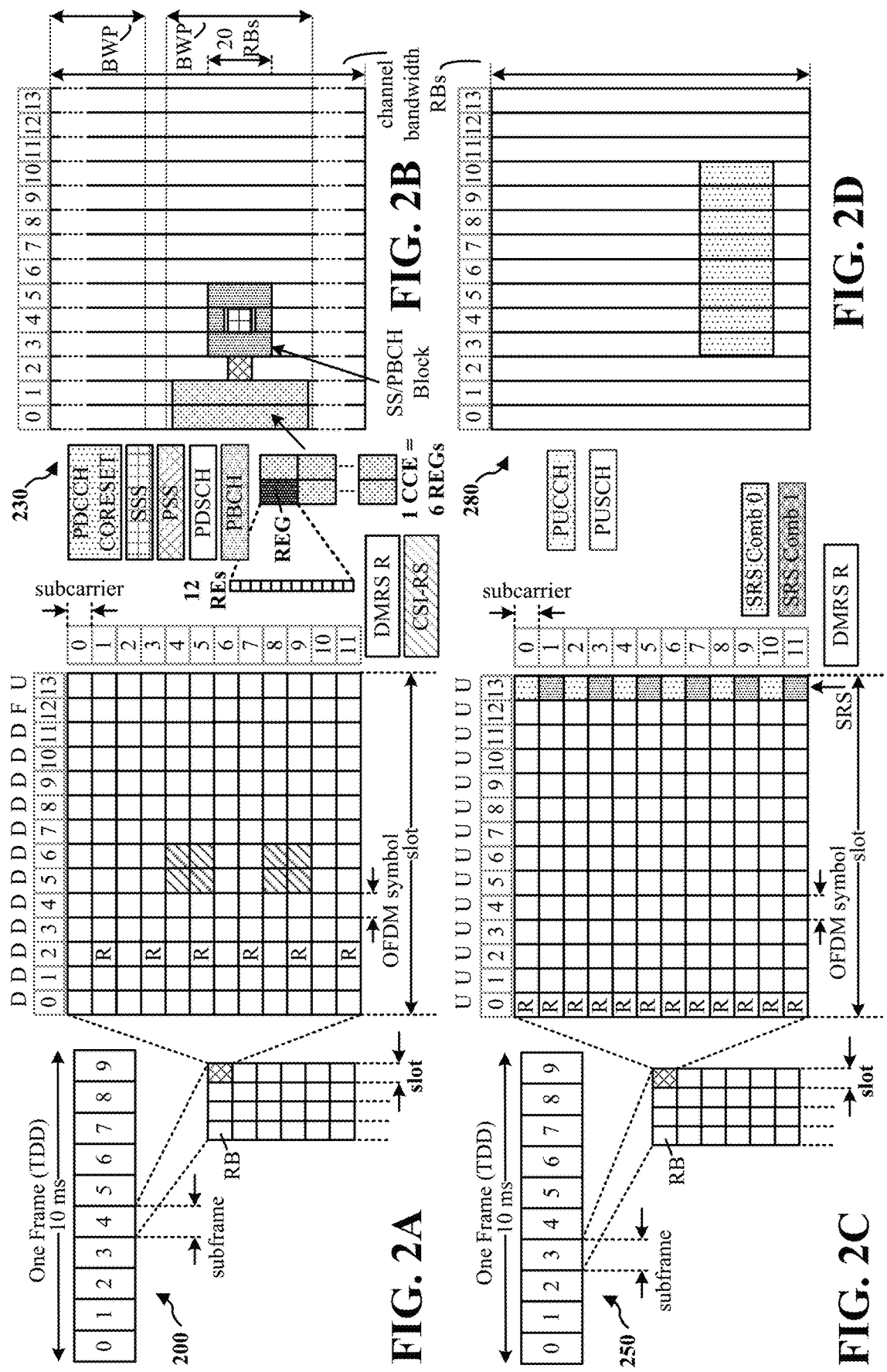
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
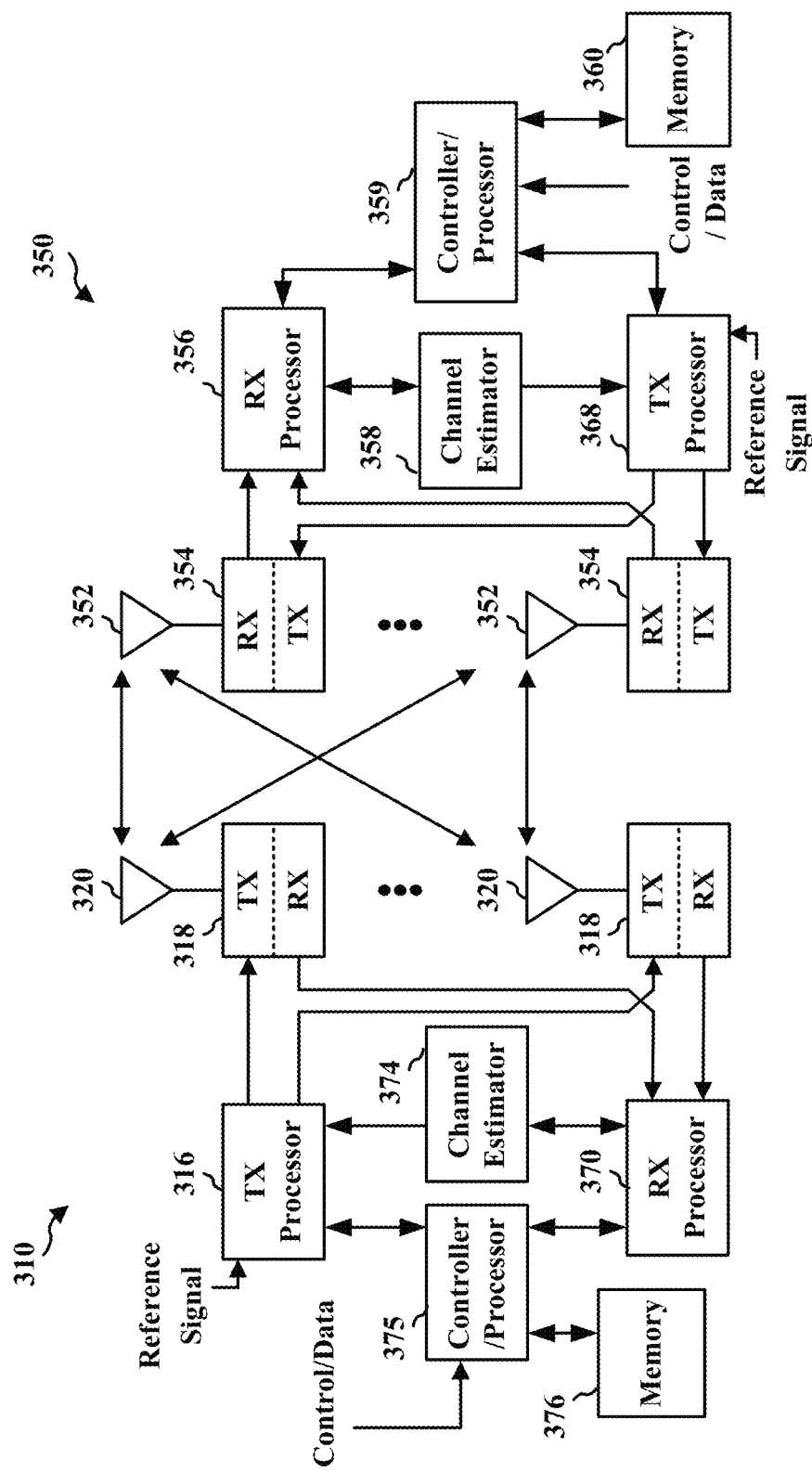
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

An O-RAN may provide a standardization of radio interfaces to procure interoperability between component radio equipment. A base station of the O-RAN may include an O-RAN distributed unit (O-DU) and an O-RAN radio unit (O-RU), lower layer function being split between the O-DU and O-RU based on a lower layer functional split. That is, the O-DU may refer to a logical node configured to host an RLC layer, a MAC layer, and High-PHY layers based on a lower layer functional split. The O-RU may refer to a logical node configured to host Low-PHY layer and RF processing based on a lower layer functional split. The O-RAN may include an open fronthaul interface between the O-RU and the O-DU, and the open fronthaul interface may include a control user synchronization (CUS) plane and a management (M) plane.

The C-plane is a control plane that may refer specifically to real-time control between the O-DU and the O-RU. The U-plane is a user plane that may refer to IQ sample data transferred between the O-DU and the O-RU. The S-plane is a synchronization plane that may refer to traffic between the O-RU or the O-DU to the synchronization controller. The M-plane is a management plane that may refer to non-real-time management operations between the O-DU and the O-RU. A section type 3 message of the C-plane may specify a scheduling and beamforming commands frame format for a PRACH and mixed numerology. The section type 3 C-plane message may contain parameters such as a CP length and/or a time offset. The O-RU may receive the section type 3 C-plane message and extract the PRACH CP, and transmit I/Q data of the PRACH CP removed PRACH preamble to the O-DU.

In some aspects, the O-RU may not support mixed numerology to reduce the cost and complexity of the O-RU. In response to the section type 3 message, the O-RU that does not support mixed numerology may perform two separate FFT for UL data when the PUSCH and the PRACH are in the same slot since the PRACH CP is different than the PUSCH CP. The embodiments of the current disclosure may propose a mechanism for the O-RU to implement the PRACH and PUSCH handling using a single FFT and send the IQ data in a format such that the O-DU may receive the IQ data from the O-RU regardless of the implementation of PRACH processing of the O-RU.

Figure 4:
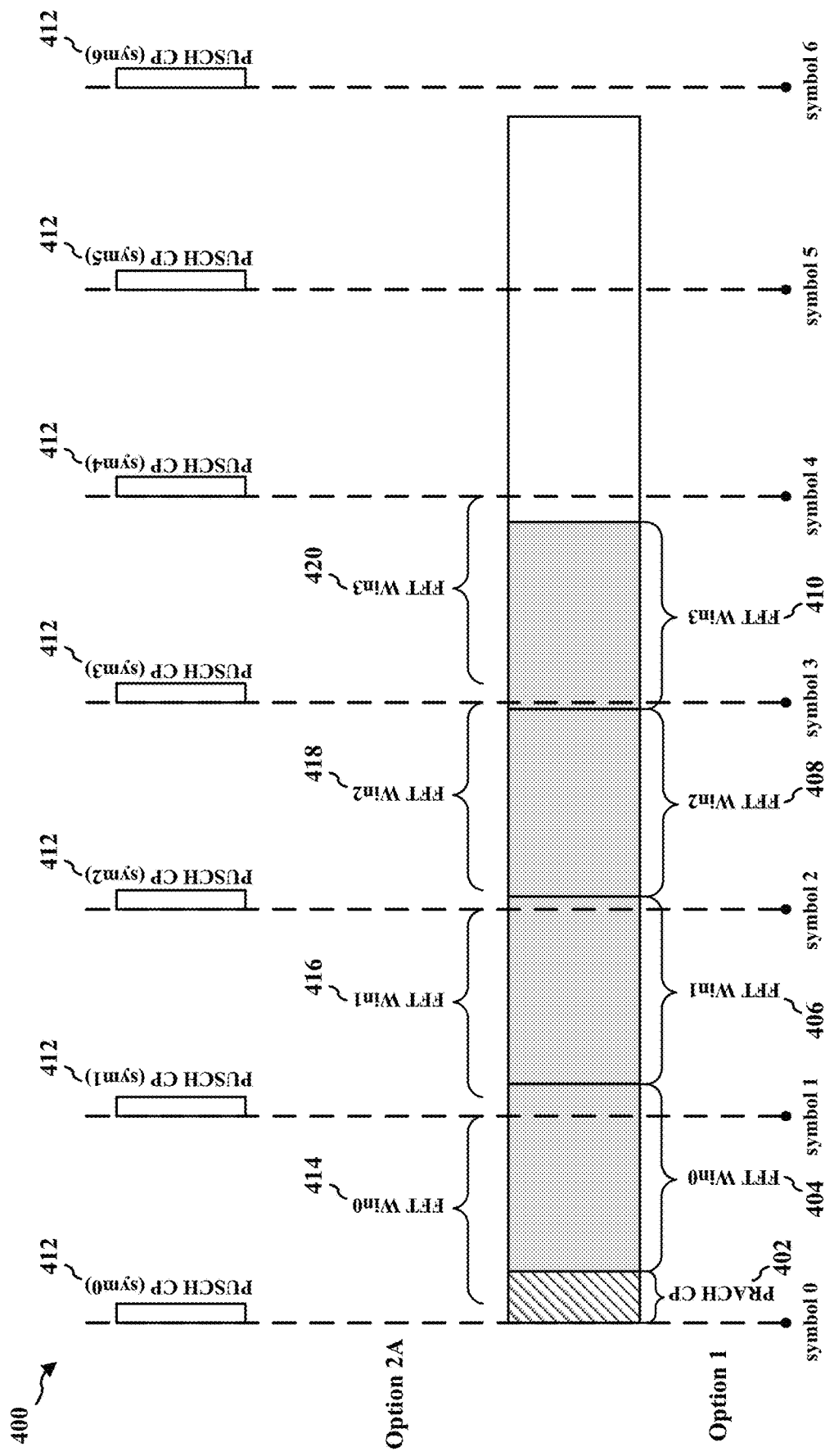
FIG. 4 illustrates examples of processing PRACH of wireless communication.

FIG. 4 illustrates examples of processing PRACH 400 of wireless communications. The O-RU may receive a section type 3 C-plane message for PRACH preamble, and the message may instruct the O-RU of the PRACH start symbol and the physical resource blocks (PRBs) requested by the O-DU. For example, the PRACH preamble may include a PRACH CP and four (4) repetitions of the preamble sequence. According to Option 1, based on the section type 3 C-plane message, the O-RU may filter the PRACH preamble by removing the PRACH CP 402, and perform the FFT per repetitions of the preamble sequence. That is, the O-RU may perform the FFT for a first FFT window 404, a second FFT window 406, a third FFT window 408, and a fourth FFT window 410, each corresponding to the four repetitions of the preamble sequence. However, when the O-RU does not support the mixed numerology, the O-RU may perform two separate FFTs for the PUSCH and the PRACH since the PRACH CP may be different from PUSCH CP.

According to Option 2A, rather than performing FFT per repetitions of the preamble sequence of the PRACH CP removed signal as shown in Option 1, the O-RU may perform FFT per PUSCH CP removed symbols of the PRACH preamble. That is, the O-RU may filter the PRACH preamble by removing the PUSCH CP 412, and perform the FFT per PUSCH CP removed symbols of the PRACH preamble. The O-RU may perform the FFT for a first FFT window 414, a second FFT window 416, a third FFT window 418, and a fourth FFT window 420, each corresponding to the symbol of the PUSCH CP removed preamble sequence. The PUSCH CP may be configured via the M-plane as part of capability exchange.

From the result of the FFT, the O-RU may extract I/Q data in the frequency domain corresponding to the PRACH preamble, and adjust the phase shift of the extracted I/Q data per symbol to account for the shifted FFT window compared to the expected FFT window used for the PRACH preamble. That is, since the first to fourth FFT windows 414, 416, 418, and 420 are shifted compared to the original first to fourth FFT windows 404, 406, 408, and 410, the O-RU may compensate for the shifted FFT windows by adjusting phase shift of the extracted I/Q data to account for the phase differences between the first to fourth FFT windows 414, 416, 418, and 420 and the original first to fourth FFT windows 404, 406, 408, and 410 of the PRACH preamble. The O-RU may send the I/Q data of the PRACH in the frequency domain to the O-DU.

According to Option 2A, the O-RU may perform one FFT for the PRACH and the PUSCH together. Therefore, the O-RU may not utilize a separate chain for processing the PRACH and the PUSCH separately, and the cost, complexity, and power specification of the O-RU may be reduced. Since the O-DU may be transparent to the processing of the PRACH I/Q data in the O-RU (e.g., whether the O-RU followed Option 1 or Option 2A), the O-RU may perform a single FFT for PRACH and PUSCH without any change or impact on the O-RAN framework.

Figure 5:
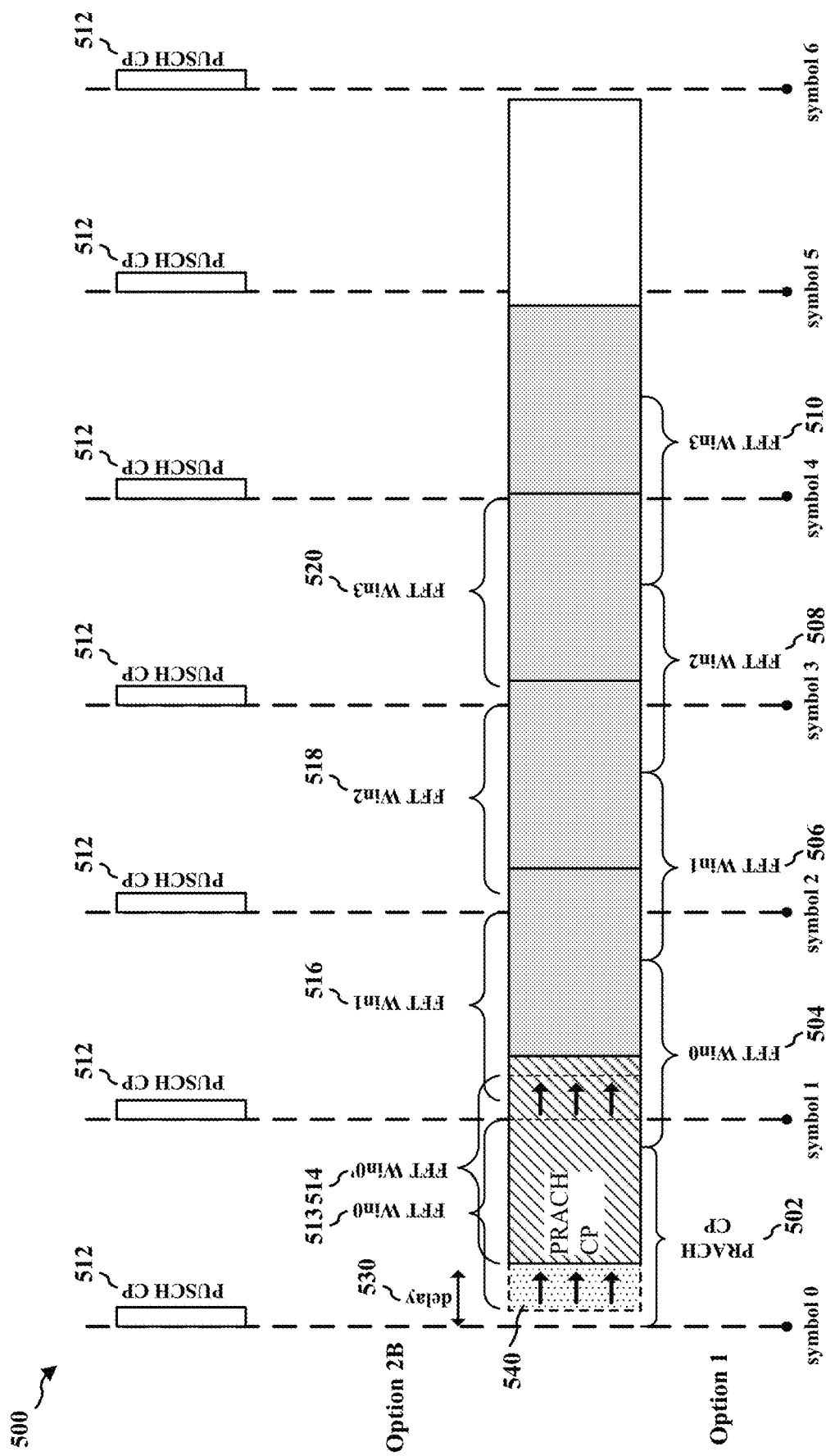
FIG. 5 illustrates examples of processing PRACH of wireless communication.

FIG. 5 illustrates examples of processing PRACH 500 of wireless communications. In some aspects, a delay 530 greater than the PUSCH CP 512 and less than the PRACH CP 502 may be associated with the PRACH preamble, and at least a part of the PRACH energy may be lost (i.e., energy loss 540) for the first FFT window corresponding to the first removed PRACH preamble symbol of the PUSCH CP.

The O-RU may receive a section type 3 C-plane message for the PRACH preamble, and the message may instruct the O-RU of the PRACH start symbol and the physical resource blocks (PRBs) requested by the O-DU. For example, the PRACH preamble may include a PRACH CP and four (4) repetitions of the preamble sequence. According to Option 1, based on the section type 3 C-plane message, the O-RU may filter the PRACH preamble by removing the PRACH CP 502, and perform the FFT per repetitions of the preamble sequence. That is, the O-RU may perform the FFT for a first FFT window 504, a second FFT window 506, a third FFT window 508, and a fourth FFT window 510, each corresponding to the four repetitions of the preamble sequence. However, when the O-RU may not support the mixed numerology, the O-RU may perform two separate FFTs for the PUSCH and the PRACH since the PRACH CP may be different from PUSCH CP. Also, Option 1 may not account for the delay 530.

According to Option 2B, the O-RU may perform FFT per PUSCH CP removed symbols of the PRACH preamble. That is, the O-RU may filter the PRACH preamble by removing the PUSCH CP 512, and perform the FFT per PUSCH CP removed symbols of the PRACH preamble. The O-RU may perform the FFT for a first FFT window 513, a second FFT window 516, a third FFT window 518, and a fourth FFT window 520, each corresponding to the symbol of the PUSCH CP removed preamble sequence. The PUSCH CP may be configured via the M-plane as part of capability exchange. The O-RU may extract the frequency domain I/Q data corresponding to the PRACH preamble.

The O-RU may detect the delay 530 associated with the PRACH preamble by checking the noise sample in the corresponding time domain by taking an inverse FFT (IFFT) of the tones of the first FFT window 513. The O-RU may also detect the delay by correlating with the reference PRACH CP or other means.

Once the O-RU determines the delay 530, the O-RU may remove the initial time domain samples equivalent to the estimated delay from the first symbol and take initial TD samples (estimated delay—PUSCH CP) from the first symbol (before removing the PUSCH CP) for the first FFT window. That is, the O-RU may shift the first FFT window 513 to a shifted first FFT window 514 by the estimated delay 530 corresponding to the detected energy loss 540. The O-RU may perform the FFT per the shifted first FFT window 514. For example, the shifted first FFT window 514 may span across two symbols (e.g., symbol 0 and symbol 1).

The O-RU may adjust the phase shift the extracted I/Q data per symbol to account for the shifted FFT window compared to the expected FFT window used for the PRACH preamble to determine the I/Q data in the frequency domain corresponding to the PRACH preamble. That is, since the shifted first FFT window 514 and the second to fourth FFT windows 516, 518, and 520 are shifted compared to the original first to fourth FFT windows 504, 506, 508, and 510, the O-RU may compensate for the shifted FFT windows by adjusting a phase shift of the extracted I/Q data to account for the phase differences between the shifted first FFT window 514 and the second to fourth FFT windows 516, 518, and 520 and the original first to fourth FFT windows 504, 506, 508, and 510 of the PRACH preamble. The O-RU may send the I/Q data of the PRACH in the frequency domain to the O-DU.

According to Option 2B, the O-RU may perform one FFT for the PRACH and PUSCH together. Therefore, the O-RU may not utilize a separate chain for processing the PRACH and PUSCH separately, and the cost, complexity, and power specification of the O-RU may be reduced. Since the O-DU may be transparent to the processing of the PRACH I/Q data in the O-RU (e.g., whether the O-RU followed Option 1 or Option 2B), the O-RU may perform a single FFT for a PRACH and a PUSCH without any change or impact on the O-RAN framework. Furthermore, the loss in PRACH energy for the first FFT window of the PRACH may be minimized or reduced. Hence, the O-RU may increase the detection probability for large delay scenarios.

On the other hand, Option 2B includes additional IIFT and FFT. Particularly, Option 2B includes one (1) reduced point IFFT corresponding to the PRACH to detect or compute the delay 530 based on the delay detection mechanism, and one (1) full point FFT for the shifted first FFT window 514, which may be performed on the first symbol and the second symbol.

In some aspects, at least one advantage over proposal one may be a function of a delay estimation accuracy.

Figure 6:
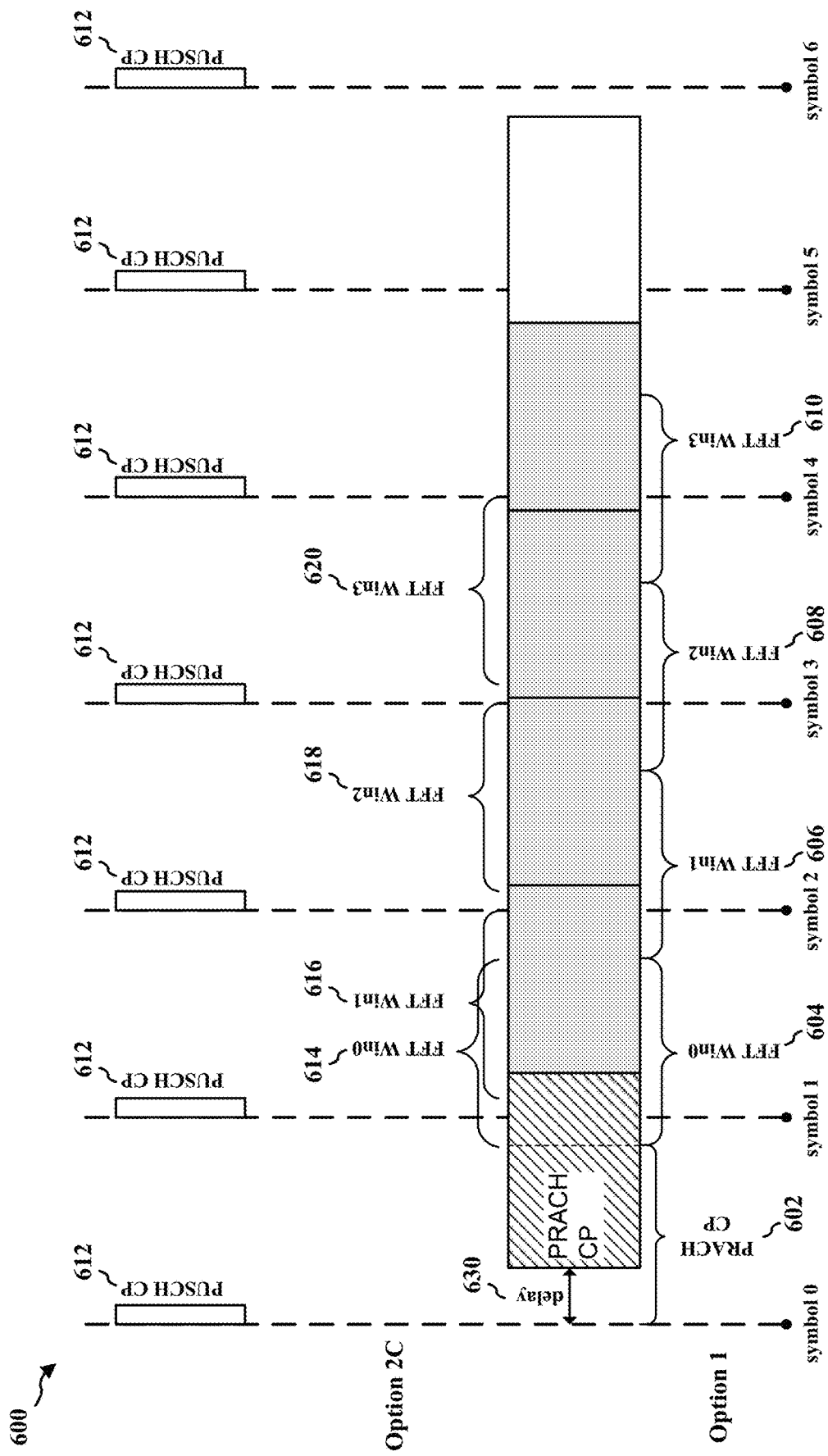
FIG. 6 illustrates examples of processing PRACH of wireless communication.

FIG. 6 illustrates examples of processing PRACH 600 of wireless communications. In some aspects, the O-RU may take a hybrid approach of Option 1 and Option 2B illustrated in FIG. 5. A delay 630 greater than the PUSCH CP 612 and less than the PRACH CP 602 may be associated with the PRACH preamble. According to Option 1, based on the section type 3 C-plane message, the O-RU may filter the PRACH preamble by removing the PRACH CP 602, and perform the FFT per repetitions of the preamble sequence. That is, the O-RU may perform the FFT for a first FFT window 604, a second FFT window 606, a third FFT window 608, and a fourth FFT window 610, each corresponding to the four repetitions of the preamble sequence. However, when the O-RU may not support the mixed numerology, the O-RU may perform two separate FFTs for the PUSCH and the PRACH since the PRACH CP may be different from the PUSCH CP. Also, Option 1 may not account for the delay 630.

According to Option 2C, rather than performing FFT per repetition on the preamble sequences of the PRACH CP removed signal, the O-RU may perform FFT per PUSCH CP removed symbols of the PRACH preamble, except a start symbol (or a first symbol) of the PRACH. The PUSCH CP may be configured via a M-plane as part of capability exchange. For the start symbol of the PRACH, a CP equivalent to PRACH CP may be removed to process the PRACH and one FFT may be taken after taking samples from the PRACH start symbol. That is, the O-RU may perform the FFT for a second FFT window 616, a third FFT window 618, and a fourth FFT window 620, each corresponding to the symbol of the PUSCH CP removed preamble sequence. For the first FFT window 614, the O-RU may shift the first FFT window 614 corresponding to the first symbol of the PRACH by the PRACH CP, and perform the FFT for the first FFT window 614.

From the result of the FFT, the O-RU may extract I/Q data in the frequency domain corresponding to the PRACH preamble and adjust the phase shift of the extracted I/Q data per symbol (except the first symbol of the PRACH) to account for the shifted FFT window compared to the expected FFT window used for the PRACH preamble. That is, since the second to fourth FFT windows 616, 618, and 620 are shifted compared to the original second to fourth FFT windows 606, 608, and 610, the O-RU may compensate for the shifted FFT windows by adjusting the phase shift of the extracted I/Q data to account for the phase differences between the second to fourth FFT windows 616, 618, and 620 and the original second to fourth FFT windows 606, 608, and 610 of the PRACH preamble. Since the first FFT window 614 of the first symbol of the PRACH is shifted by the PRACH CP, the first FFT window 614 overlaps with the original first FT window 604. The O-RU may send the I/Q data of the PRACH in the frequency domain to the O-DU.

According to Option 2C, the O-RU may perform one FFT for the PRACH and PUSCH together except for the first symbol of the PRACH. Therefore, the O-RU may not utilize a separate chain for processing the PRACH and PUSCH separately, and the cost, complexity, and power specification of the O-RU may be reduced. Since the O-DU may be transparent to the processing of the PRACH I/Q data in the O-RU (e.g., whether the O-RU followed Option 1 or Option 2C), the O-RU may perform a single FFT for the PRACH and the PUSCH without any change or impact on the O-RAN framework. Furthermore, the loss in PRACH energy for the first FFT window of the PRACH may be eliminated or reduced. Hence, the O-RU may increase the detection probability for large delay scenarios. Furthermore, the O-RU may not perform an initial estimation of delay, compared to Option 2B.

However, Option 2C may utilize one full FFT, compared to proposal 1, and if the PRACH CP is close to a symbol length (e.g., PRACH format C2), the time domain sample of the first FFT window and the second FFT window may overlap almost completely, and therefore, may have a reduced time diversity gain. (i.e., Option 2C may be more viable for other PRACH formats, such as B2, B3, and/or B4).

Figure 7:
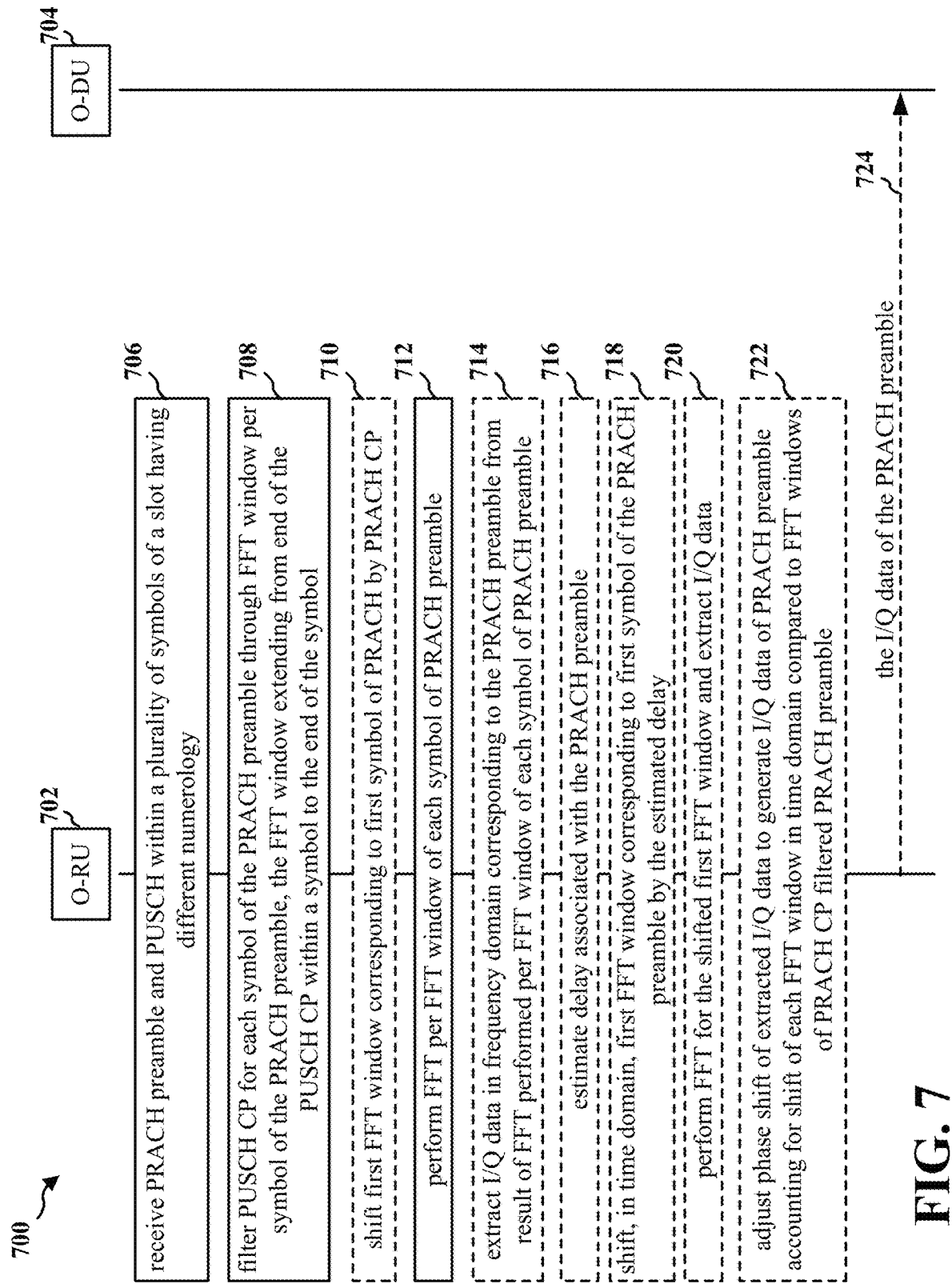
FIG. 7 is a call-flow diagram of a wireless communication.

FIG. 7 is a call-flow diagram 700 of a wireless communication, including an O-RU 702 and an O-DU 704.

At 706, the O-RU 702 may receive a PRACH preamble and a PUSCH within a plurality of symbols of a slot, the PRACH and the PUSCH having different numerology, the PRACH preamble including a PRACH CP in a first symbol of the slot, the PUSCH including a PUSCH CP in each of the symbols of the slot.

At 708, the O-RU 702 may filter the PUSCH CP for each symbol of the PRACH preamble through a FFT window per symbol of the PRACH preamble, the FFT window extending from the end of the PUSCH CP within a symbol to the end of the symbol. The first FFT window of the first symbol may include a portion of the PRACH CP.

At 710, the O-RU 702 may shift, in time domain, a first FFT window corresponding to a first symbol of the PRACH by a PRACH CP. The first FFT window of the first symbol includes a portion of the PRACH CP.

At 712, the O-RU 702 may perform FFT per the FFT window of each symbol of the PRACH preamble.

At 714, the O-RU 702 may extract I/Q data in frequency domain corresponding to the PRACH preamble from the result of the FFT performed per the FFT window of each symbol of the PRACH preamble.

At 716, the O-RU 702 may estimate a delay associated with the PRACH preamble. The delay associated with the PRACH preamble may be estimated by checking a time domain noise sample by taking an IFFT of the extracted I/Q data of the first FFT window, or correlating with a reference PRACH preamble CP.

At 718, the O-RU 702 may shift, in time domain, a first FFT window corresponding to a first symbol of the PRACH preamble by the estimated delay. The shifted first FFT window may span across two symbols.

At 720, the O-RU 702 may perform FFT for the shifted first FFT window.

At 722, the O-RU 702 may adjust phase shift of the extracted I/Q data to generate the I/Q data of the PRACH preamble, the phase shift accounting for shift of the each FFT window in time domain compared to FFT windows of PRACH CP filtered PRACH preamble.

At 724, the O-RU 702 may send the I/Q data of the PRACH preamble to an O-DU 704.

Figure 8:
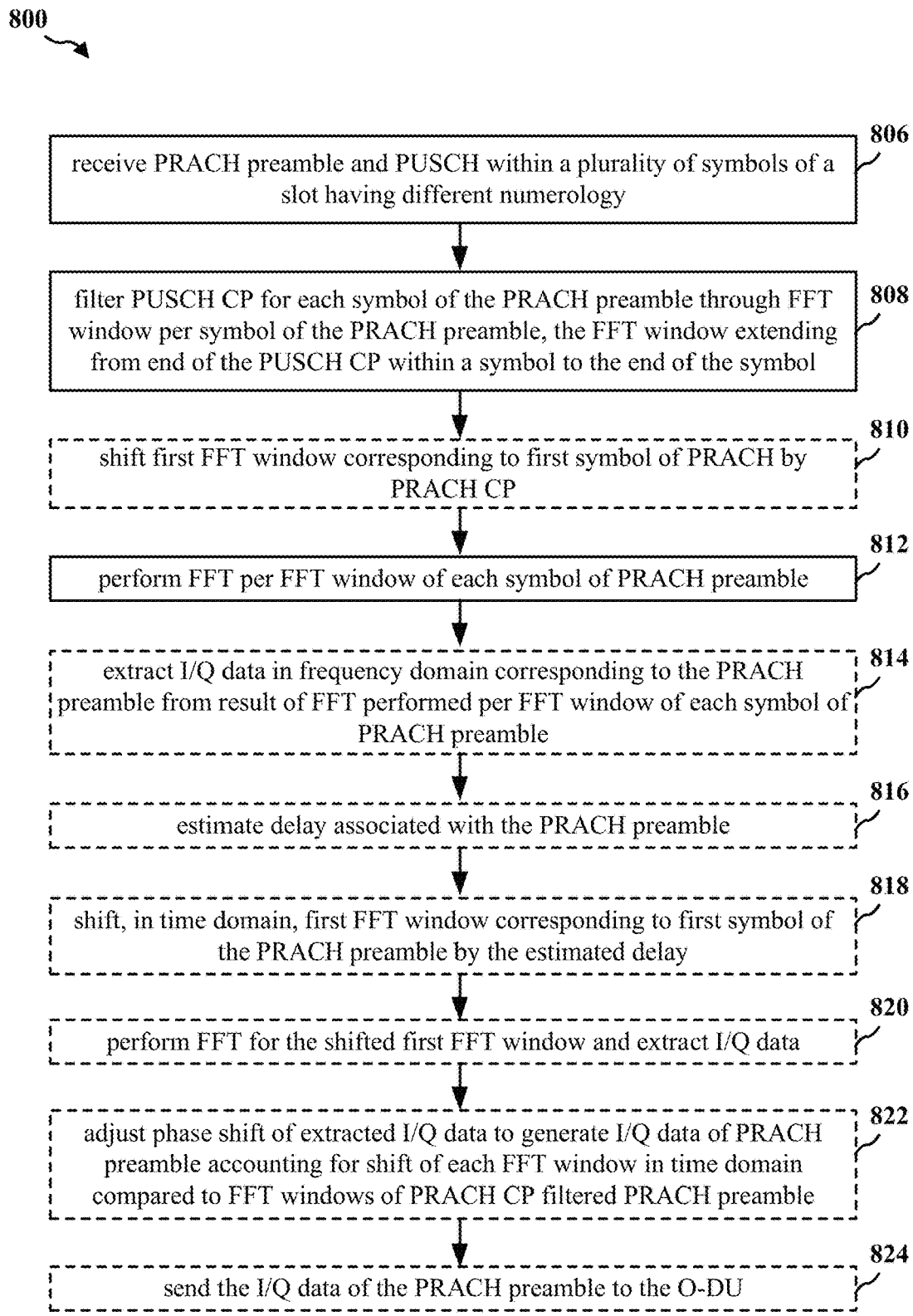
FIG. 8 is a flowchart of a method of wireless communication.

FIG. 8 is a flowchart 800 of a method of wireless communication. The method may be performed by an O-RU of a base station (e.g., the base station 102/180; the apparatus 902.

At 806, the O-RU may receive a PRACH preamble and a PUSCH within a plurality of symbols of a slot, the PRACH and the PUSCH having different numerology (e.g., as at 706). The PRACH preamble including a PRACH CP in a first symbol of the slot, the PUSCH including a PUSCH CP in each of the symbols of the slot. For example, 806 may be performed by a PRACH processing component 940.

At 808, the O-RU may filter the PUSCH CP for each symbol of the PRACH preamble through a FFT window per symbol of the PRACH preamble, the FFT window extending from the end of the PUSCH CP within a symbol to the end of the symbol (e.g., as at 708). The first FFT window of the first symbol may include a portion of the PRACH CP. For example, 808 may be performed by the PRACH processing component 940.

At 810, the O-RU may shift, in time domain, a first FFT window corresponding to a first symbol of the PRACH by a PRACH CP (e.g., as at 710). The first FFT window of the first symbol includes a portion of the PRACH CP. For example, 810 may be performed by the PRACH processing component 940.

At 812, the O-RU may perform FFT per the FFT window of each symbol of the PRACH preamble (e.g., as at 712). For example, 812 may be performed by the PRACH processing component 940.

At 814, the O-RU may extract I/Q data in frequency domain corresponding to the PRACH preamble from the result of the FFT performed per the FFT window of each symbol of the PRACH preamble (e.g., as at 714). For example, 814 may be performed by an I/Q data processing component 942.

At 816, the O-RU may estimate a delay associated with the PRACH preamble (e.g., as at 716). The delay associated with the PRACH preamble may be estimated by checking a time domain noise sample by taking an IFFT of the extracted I/Q data of the first FFT window, or correlating with a reference PRACH preamble CP. For example, 816 may be performed by a delay estimating component 944.

At 818, the O-RU may shift, in time domain, a first FFT window corresponding to a first symbol of the PRACH preamble by the estimated delay (e.g., as at 718). The shifted first FFT window may span across two symbols. For example, 818 may be performed by the PRACH processing component 940.

At 820, the O-RU may perform FFT for the shifted first FFT window (e.g., as at 720). For example, 820 may be performed by the PRACH processing component 940.

At 822, the O-RU may adjust phase shift of the extracted I/Q data to generate the I/Q data of the PRACH preamble, the phase shift accounting for shift of the each FFT window in time domain compared to FFT windows of PRACH CP filtered PRACH preamble (e.g., as at 722). For example, 822 may be performed by the I/Q data processing component 942.

At 824, the O-RU may send the I/Q data of the PRACH preamble to an O-DU (e.g., as at 724). For example, 824 may be performed by the I/Q data processing component 942.

Figure 9:
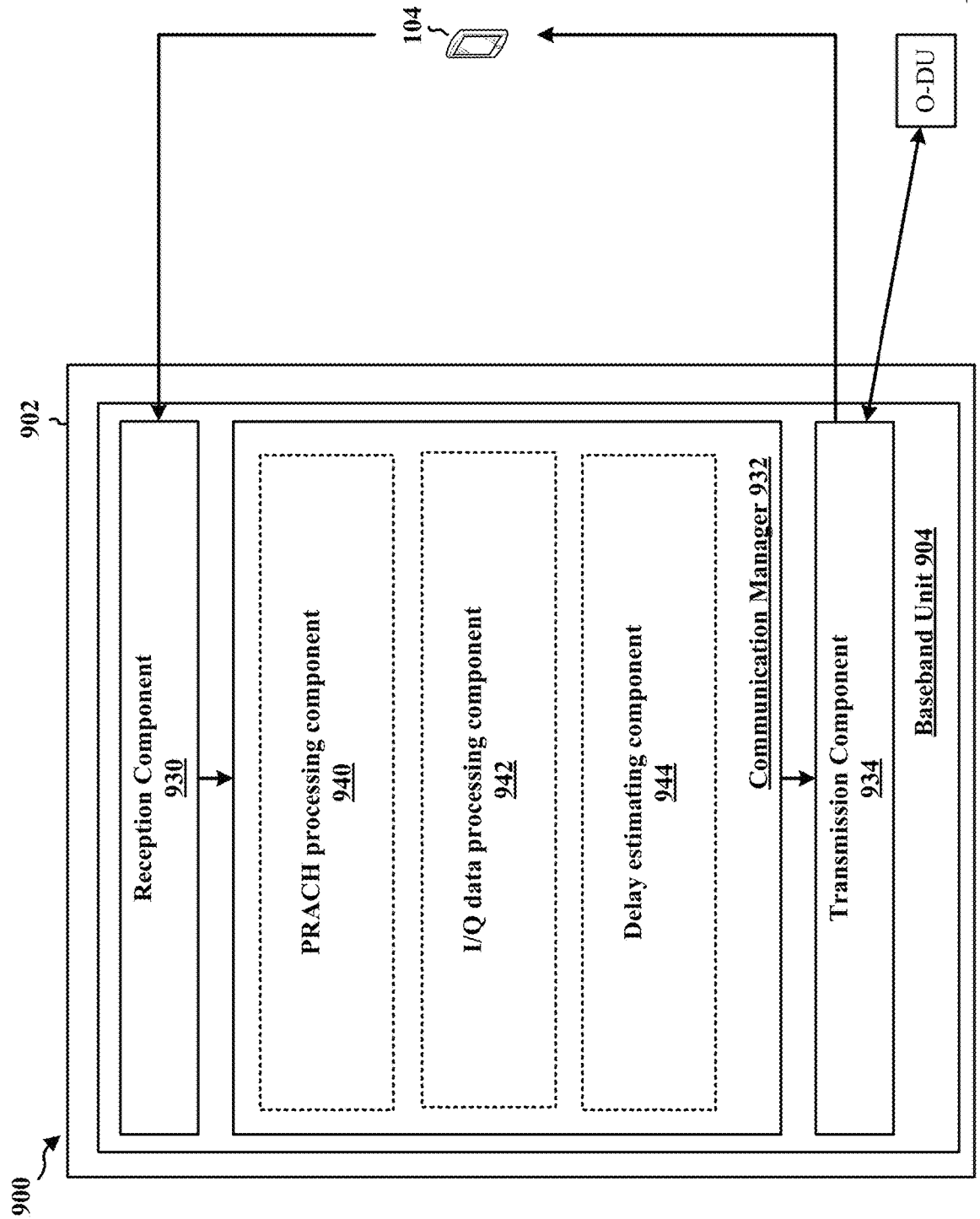
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a PRACH processing component 940 that is configured to receive a PRACH preamble and a PUSCH within a plurality of symbols of a slot, the PRACH and the PUSCH having different numerology, filter the PUSCH CP for each symbol of the PRACH preamble through a FFT window per symbol of the PRACH preamble, the FFT window extending from the end of the PUSCH CP within a symbol to the end of the symbol, shift, in time domain, a first FFT window corresponding to a first symbol of the PRACH by a PRACH CP, perform FFT per the FFT window of each symbol of the PRACH preamble, shift, in time domain, a first FFT window corresponding to a first symbol of the PRACH preamble by the estimated delay, and perform FFT for the shifted first FFT window, e.g., as described in connection with 806, 808, 810, 812, 818, and 820. The communication manager 932 further includes an I/Q data processing component 942 that is configured to extract I/Q data in frequency domain corresponding to the PRACH preamble from the result of the FFT performed per the FFT window of each symbol of the PRACH preamble, adjust phase shift of the extracted I/Q data to generate the I/Q data of the PRACH preamble, the phase shift accounting for shift of the each FFT window in time domain compared to FFT windows of PRACH CP filtered PRACH preamble, and send the I/Q data of the PRACH preamble to an O-DU, e.g., as described in connection with 814, 822, and 824. The communication manager 932 further includes a delay estimating component 944 that is configured to estimate a delay associated with the PRACH preamble, e.g., as described in connection with 816.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving a PRACH preamble and a PUSCH within a plurality of symbols of a slot, the PRACH and the PUSCH having different numerology, the PRACH preamble including a PRACH CP in a first symbol of the slot, the PUSCH including a PUSCH CP in each of the symbols of the slot, means for filtering the PUSCH CP for each symbol of the PRACH preamble through a FFT window per symbol of the PRACH preamble, the FFT window extending from the end of the PUSCH CP within a symbol to the end of the symbol, and means for performing FFT per the FFT window of each symbol of the PRACH preamble. The apparatus 902 includes means for adjusting phase shift of the extracted I/Q data to generate the I/Q data of the PRACH preamble, the phase shift accounting for shift of the each FFT window in time domain compared to FFT windows of PRACH CP filtered PRACH preamble, and means for sending the I/Q data of the PRACH preamble to an O-DU. The apparatus 902 also includes means for extracting I/Q data in frequency domain corresponding to the PRACH preamble from the result of the FFT performed per the FFT window of each symbol of the PRACH preamble, means for estimating a delay associated with the PRACH preamble, means for shifting, in time domain, a first FFT window corresponding to a first symbol of the PRACH preamble by the estimated delay, and means for performing FFT for the shifted first FFT window. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring again to FIGS. 4, 5, 6, 7, 8, and 9, an O-RU may receive a PRACH preamble and a PUSCH within a plurality of symbols of a slot, the PRACH and the PUSCH having different numerology. The O-RU may filter a PUSCH CP for each symbol of the PRACH preamble through a FFT window per symbol of the PRACH preamble, the FFT window extending from the end of the PUSCH CP within a symbol to the end of the symbol, and perform FFT per the FFT window of each symbol of the PRACH preamble. The O-RU may extract I/Q data in frequency domain corresponding to the PRACH preamble, adjust phase shift of the extracted I/Q data to generate the I/Q data of the PRACH preamble accounting for shift of the each FFT window in time domain compared to FFT windows of PRACH CP filtered PRACH preamble and send the I/Q data of the PRACH preamble to an O-DU. The O-RU may estimate a delay associated with the PRACH preamble, shift, in time domain, a first FFT window corresponding to a first symbol of the PRACH preamble by the estimated delay, and perform FFT for the shifted first FFT window. The delay associated with the PRACH preamble is estimated by checking time domain noise sample by taking inverse FFT (IFFT) of the extracted I/Q data of the first FFT window, or correlating with a reference PRACH preamble CP. The shifted first FFT window spans across two symbols. The O-RU may also shift, in time domain, a first FFT window corresponding to a first symbol of the PRACH by a PRACH CP.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at an O-RU, including: receiving a PRACH preamble and a PUSCH within a plurality of symbols of a slot, the PRACH and the PUSCH having different numerology, the PRACH preamble including a PRACH CP in a first symbol of the slot, the PUSCH including a PUSCH CP in each of the symbols of the slot; filtering the PUSCH CP for each symbol of the PRACH preamble through a FFT window per symbol of the PRACH preamble, the FFT window extending from the end of the PUSCH CP within a symbol to the end of the symbol; and performing FFT per the FFT window of each symbol of the PRACH preamble.

Example 2 is the method of Example 1, where a first FFT window of the first symbol includes a portion of the PRACH CP.

Example 3 is the method of any of Examples 1 and 2, further including extracting I/Q data in frequency domain corresponding to the PRACH preamble from the result of the FFT performed per the FFT window of each symbol of the PRACH preamble.

Example 4 is the method of any of Examples 1 to 3, further including adjusting phase shift of the extracted I/Q data to generate the I/Q data of the PRACH preamble, the phase shift accounting for shift of the each FFT window in time domain compared to FFT windows of PRACH CP filtered PRACH preamble; and sending the I/Q data of the PRACH preamble to an O-DU.

Example 5 is the method of any of Examples 1 and 2, further including: extracting I/Q data in frequency domain corresponding to the PRACH preamble from the result of the FFT performed per the FFT window of each symbol of the PRACH preamble; estimating a delay associated with the PRACH preamble; shifting, in time domain, a first FFT window corresponding to a first symbol of the PRACH preamble by the estimated delay; and performing FFT for the shifted first FFT window.

Example 6 is the method of any of Examples 1, 2, and 5, wherein the delay associated with the PRACH preamble is estimated by at least one of checking time domain noise sample by taking IFFT of the extracted I/Q data of the first FFT window, or correlating with a reference PRACH preamble CP.

Example 7 is the method of any of Examples 1, 2, 5, and 6, wherein the shifted first FFT window spans across two symbols.

Example 8 is the method of any of Examples 1 and 2, further including adjusting phase shift of the extracted I/Q data to generate the I/Q data of the PRACH preamble, the phase shift accounting for shift of the each FFT window in time domain compared to FFT windows of PRACH CP filtered PRACH preamble, and sending the I/Q data of the PRACH preamble to an O-DU.

Example 9 is the method of any of Examples 1, 2, and 8, wherein the filtering the PUSCH CP for each symbol of the PRACH preamble through the FFT window per symbol of the PRACH preamble includes shifting, in time domain, a first FFT window corresponding to a first symbol of the PRACH by a PRACH CP.

Example 10 is the method of any of Examples 1, 2, 8, and 9, wherein the first FFT window of the first symbol includes a portion of the PRACH CP.

Example 11 is the method of any of Examples 1, 2, 8, 9, and 10, further including extracting I/Q data in frequency domain corresponding to the PRACH preamble from the result of the FFT performed per the FFT window of each symbol of the PRACH preamble.

Example 12 is the method of any of Examples 1, 2, 8, 9, 10, and 11, further including adjusting phase shift of the extracted I/Q data, except for the first FFT window, to generate the I/Q data of the PRACH preamble, the phase shift accounting for shift of the each FFT window in time domain compared to FFT windows of the PRACH CP filtered PRACH preamble, and sending the I/Q data of the PRACH preamble to an O-DU.

Example 13 is a device including one or more processors and one or more memories in electronic communication with the one or more processors storing instructions executable by the one or more processors to cause the device to implement a method as in any of Examples 1-12.

Example 14 is a system or apparatus including means for implementing a method or realizing an apparatus as in any of Examples 1-12.

Example 15 is a non-transitory computer readable medium storing instructions executable by one or more processors to cause the one or more processors to implement a method as in any of Examples 1-12.

What is claimed is:

1. An apparatus for wireless communication at an open radio access network (O-RAN) radio unit (O-RU), comprising:
   at least one memory; and
   at least one processor coupled to the at least one memory and, based at least in part on information stored in the at least one memory, the at least one processor, individually or in any combination, is configured to:
      receive a physical random access channel (PRACH) preamble and a physical uplink shared channel (PUSCH) within a plurality of symbols of a slot, the PRACH preamble including a PRACH cyclic prefix (CP) in a first symbol of the slot, the PUSCH including a PUSCH CP in each of the symbols of the slot;
      filter the PUSCH CP for each symbol of the PRACH preamble through a fast Fourier transform (FFT) window per symbol of the PRACH preamble, the FFT window extending from an end of the PUSCH CP within a symbol to an end of the symbol; and
      perform FFT per the FFT window of each symbol of the PRACH preamble.

2. The apparatus of claim 1, wherein a first FFT window of the first symbol includes a portion of the PRACH CP.

3. The apparatus of claim 1, wherein the at least one processor, individually or in any combination, is further configured to extract inphase and quadrature (I/Q) data in frequency domain corresponding to the PRACH preamble from a result of the FFT performed per the FFT window of each symbol of the PRACH preamble.

4. The apparatus of claim 3, wherein the at least one processor, individually or in any combination, is further configured to:
   adjust phase shift of the extracted I/Q data to generate the I/Q data of the PRACH preamble, the phase shift being based on shift of the each FFT window in time domain compared to FFT windows of PRACH CP filtered PRACH preamble; and
   send the I/Q data of the PRACH preamble to an O-RAN distribution unit (O-DU).

5. The apparatus of claim 1, wherein the at least one processor, individually or in any combination, is further configured to:
   extract inphase and quadrature (I/Q) data in frequency domain corresponding to the PRACH preamble from a result of the FFT performed per the FFT window of each symbol of the PRACH preamble;
   estimate a delay associated with the PRACH preamble;
   shift, in time domain, a first FFT window corresponding to a first symbol of the PRACH preamble by the estimated delay; and
   perform FFT for the shifted first FFT window.

6. The apparatus of claim 5, wherein to estimate the delay associated with the PRACH preamble, the at least one processor, individually or in any combination, is configured to at least one of:
   check time domain noise sample by taking inverse FFT (IFFT) of the extracted I/Q data of the first FFT window, or
   correlate with a reference PRACH preamble CP.

7. The apparatus of claim 5, wherein the shifted first FFT window spans across two symbols.

8. The apparatus of claim 5, wherein the at least one processor, individually or in any combination, is further configured to:
   adjust phase shift of the extracted I/Q data to generate the I/Q data of the PRACH preamble, the phase shift being based on shift of the each FFT window in time domain compared to FFT windows of PRACH CP filtered PRACH preamble; and
   send the I/Q data of the PRACH preamble to an O-RAN distribution unit (O-DU).

9. The apparatus of claim 1, wherein the at least one processor, individually or in any combination, is further configured to:
   filter the PUSCH CP for each symbol of the PRACH preamble through the FFT window per symbol of the PRACH preamble may be further configured to shift, in time domain, a first FFT window corresponding to a first symbol of the PRACH by a PRACH CP.

10. The apparatus of claim 9, wherein the first FFT window of the first symbol includes a portion of the PRACH CP.

11. The apparatus of claim 9, wherein the at least one processor, individually or in any combination, is further configured to extract inphase and quadrature (I/Q) data in frequency domain corresponding to the PRACH preamble from a result of the FFT performed per the FFT window of each symbol of the PRACH preamble.

12. The apparatus of claim 11, wherein the at least one processor, individually or in any combination, is further configured to:
   adjust phase shift of the extracted I/Q data, except for the first FFT window, to generate the I/Q data of the PRACH preamble, the phase shift being based on shift of the each FFT window in time domain compared to FFT windows of the PRACH CP filtered PRACH preamble; and
   send the I/Q data of the PRACH preamble to an O-RAN distribution unit (O-DU).

13. A method of wireless communication at an open radio access network (O-RAN) radio unit (O-RU), comprising:
   receiving a physical random access channel (PRACH) preamble and a physical uplink shared channel (PUSCH) within a plurality of symbols of a slot, the PRACH preamble including a PRACH cyclic prefix (CP) in a first symbol of the slot, the PUSCH including a PUSCH CP in each of the symbols of the slot;

filtering the PUSCH CP for each symbol of the PRACH preamble through a fast Fourier transform (FFT) window per symbol of the PRACH preamble, the FFT window extending from an end of the PUSCH CP within a symbol to an end of the symbol; and performing FFT per the FFT window of each symbol of the PRACH preamble.

14. The method of claim 13, wherein a first FFT window of the first symbol includes a portion of the PRACH CP.

15. The method of claim 13, further comprising extracting inphase and quadrature (I/Q) data in frequency domain corresponding to the PRACH preamble from a result of the FFT performed per the FFT window of each symbol of the PRACH preamble.

16. The method of claim 15, further comprising:
adjusting phase shift of the extracted I/Q data to generate the I/Q data of the PRACH preamble, the phase shift being based on shift of the each FFT window in time domain compared to FFT windows of PRACH CP filtered PRACH preamble; and
sending the I/Q data of the PRACH preamble to an O-RAN distribution unit (O-DU).

17. The method of claim 13, further comprising:
extracting inphase and quadrature (I/Q) data in frequency domain corresponding to the PRACH preamble from a result of the FFT performed per the FFT window of each symbol of the PRACH preamble;
estimating a delay associated with the PRACH preamble;
shifting, in time domain, a first FFT window corresponding to a first symbol of the PRACH preamble by the estimated delay; and
performing FFT for the shifted first FFT window.

18. The method of claim 17, wherein the delay associated with the PRACH preamble is estimated by at least one of:
checking time domain noise sample by taking inverse FFT (IFFT) of the extracted I/Q data of the first FFT window, or
correlating with a reference PRACH preamble CP.

19. The method of claim 17, wherein the shifted first FFT window spans across two symbols.

20. The method of claim 17, further comprising:
adjusting phase shift of the extracted I/Q data to generate the I/Q data of the PRACH preamble, the phase shift being based on shift of the each FFT window in time domain compared to FFT windows of PRACH CP filtered PRACH preamble; and
sending the I/Q data of the PRACH preamble to an O-RAN distribution unit (O-DU).

21. The method of claim 13, wherein the filtering the PUSCH CP for each symbol of the PRACH preamble through the FFT window per symbol of the PRACH preamble comprises shifting, in time domain, a first FFT window corresponding to a first symbol of the PRACH by a PRACH CP.

22. The method of claim 21, wherein the first FFT window of the first symbol includes a portion of the PRACH CP.

23. The method of claim 21, further comprising:
extracting inphase and quadrature (I/Q) data in frequency domain corresponding to the PRACH preamble from a result of the FFT performed per the FFT window of each symbol of the PRACH preamble.

24. The method of claim 23, further comprising:
adjusting phase shift of the extracted I/Q data, except for the first FFT window, to generate the I/Q data of the PRACH preamble, the phase shift being based on shift of the each FFT window in time domain compared to FFT windows of the PRACH CP filtered PRACH preamble; and
sending the I/Q data of the PRACH preamble to an O-RAN distribution unit (O-DU).

25. An apparatus for wireless communication at an open radio access network (O-RAN) radio unit (O-RU), comprising:
means for receiving a physical random access channel (PRACH) preamble and a physical uplink shared channel (PUSCH) within a plurality of symbols of a slot, the PRACH preamble including a PRACH cyclic prefix (CP) in a first symbol of the slot, the PUSCH including a PUSCH CP in each of the symbols of the slot;
means for filtering the PUSCH CP for each symbol of the PRACH preamble through a fast Fourier transform (FFT) window per symbol of the PRACH preamble, the FFT window extending from an end of the PUSCH CP within a symbol to an end of the symbol; and
means for performing FFT per the FFT window of each symbol of the PRACH preamble.

26. The apparatus of claim 25, wherein a first FFT window of the first symbol includes a portion of the PRACH CP.

27. The apparatus of claim 25, further comprising means for extracting inphase and quadrature (I/Q) data in frequency domain corresponding to the PRACH preamble from a result of the FFT performed per the FFT window of each symbol of the PRACH preamble.

28. The apparatus of claim 27, further comprising:
means for adjusting phase shift of the extracted I/Q data to generate the I/Q data of the PRACH preamble, the phase shift being based on shift of the each FFT window in time domain compared to FFT windows of PRACH CP filtered PRACH preamble; and
means for sending the I/Q data of the PRACH preamble to an O-RAN distribution unit (O-DU).

29. The apparatus of claim 25, further comprising:
means for extracting inphase and quadrature (I/Q) data in frequency domain corresponding to the PRACH preamble from a result of the FFT performed per the FFT window of each symbol of the PRACH preamble;
means for estimating a delay associated with the PRACH preamble;
means for shifting, in time domain, a first FFT window corresponding to a first symbol of the PRACH preamble by the estimated delay; and
means for performing FFT for the shifted first FFT window.

30. A non-transitory computer-readable medium storing computer executable code of an open radio access network (O-RAN) radio unit (O-RU), the code when executed by at least one processor causes the at least one processor to:
receive a physical random access channel (PRACH) preamble and a physical uplink shared channel (PUSCH) within a plurality of symbols of a slot, the PRACH preamble including a PRACH cyclic prefix (CP) in a first symbol of the slot, the PUSCH including a PUSCH CP in each of the symbols of the slot;
filter the PUSCH CP for each symbol of the PRACH preamble through a fast Fourier transform (FFT) window per symbol of the PRACH preamble, the FFT window extending from an end of the PUSCH CP within a symbol to an end of the symbol; and perform FFT per the FFT window of each symbol of the PRACH preamble.

* * * * *